United States Patent

Smith et al.

[15] 3,660,192
[45] May 2, 1972

[54] METHOD OF MAKING SEALING RING WITH RESILIENT CORE

[72] Inventors: Robert D. Smith, Wilmington; Ronald L. Herron, Newark, both of Del.

[73] Assignee: E. I. du Pont de Nemours and Company, Wilmington, Del.

[22] Filed: June 19, 1968

[21] Appl. No.: 738,214

[52] U.S. Cl..............................156/155, 156/122, 156/145, 156/157, 156/304, 277/228, 156/156, 156/217
[51] Int. Cl..........................................................B65d 53/02
[58] Field of Search.................156/304, 214, 145, 147, 156, 156/157, 158, 122; 277/34.3, 34.6, 226, 228; 264/265, 267

[56] References Cited

UNITED STATES PATENTS

| | | | |
|---|---|---|---|
| 2,963,394 | 12/1960 | Wilkinson | 156/304 |
| 2,906,552 | 9/1959 | White | 277/228 |
| 2,717,023 | 9/1955 | Hetherington | 277/228 |
| 2,447,340 | 8/1948 | Jackson | 277/228 |
| 2,442,369 | 6/1948 | McBride | 277/228 |
| 1,646,356 | 10/1927 | Johnson | 264/267 |
| 2,776,154 | 1/1957 | Leistensnider | 277/226 |
| 2,815,966 | 12/1957 | House | 277/207 |
| 2,837,360 | 6/1958 | Ladd | 277/226 |
| 2,893,060 | 7/1959 | Wills | 277/226 |
| 3,258,271 | 6/1966 | Hollingsworth | 277/34.3 |
| 3,339,931 | 9/1967 | Hundt et al. | 264/265 |
| 3,360,273 | 12/1967 | Hundt et al. | 264/267 |

*Primary Examiner*—Carl D. Quarforth
*Assistant Examiner*—B. H. Hunt
*Attorney*—Harry E. Braddock

[57] ABSTRACT

The invention deals with a method of making endless sealing ring members by forming a sleeve element of a solid high molecular weight copolymer of hexafluoropropylene and tetrafluoroethylene into a loop. The ends are butt-welded to form a smooth toroidal ring. A hole is punched in the side through which entrapped fluid is removed and a liquid silicone rubber composition is injected to form a core. The point of injection is sealed and the core material is solidified.

8 Claims, 18 Drawing Figures

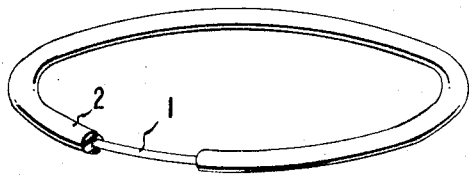
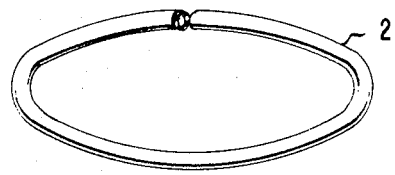
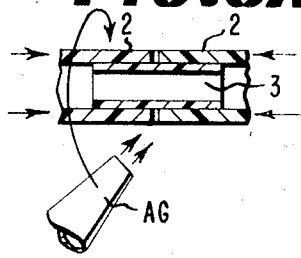
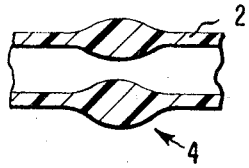
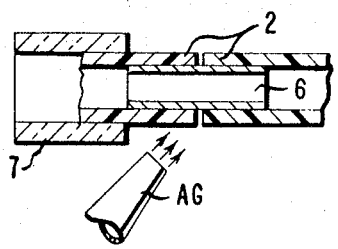
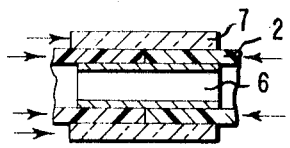
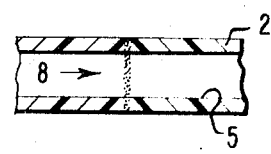
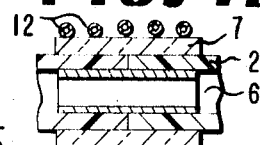
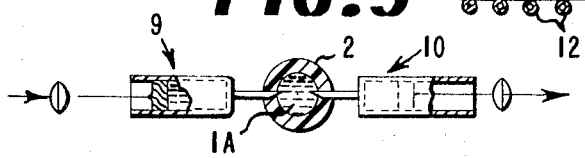
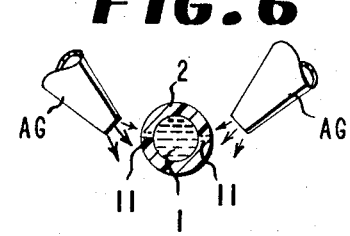
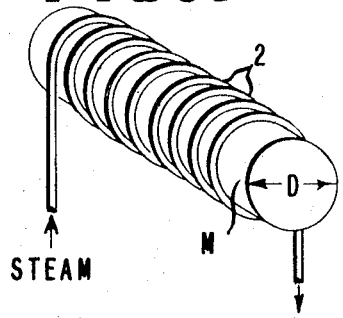
INVENTORS
ROBERT DILMAN SMITH
RONALD LEE HERRON
BY Harry E. Braddock
ATTORNEY

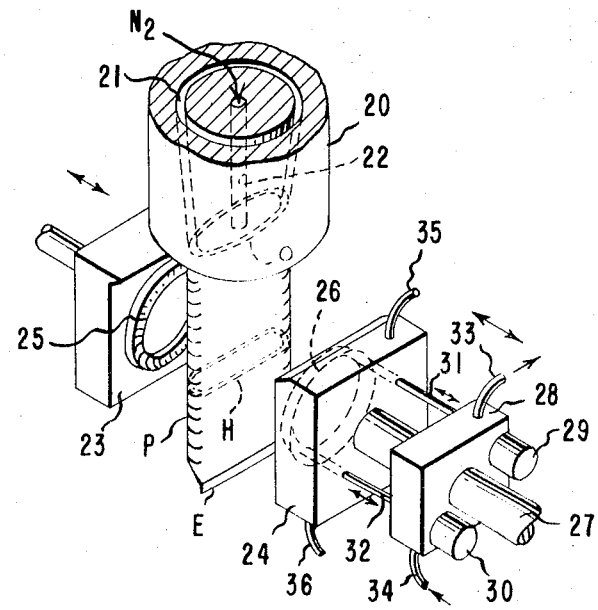
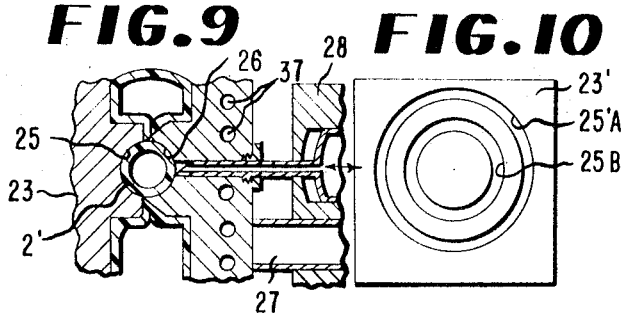
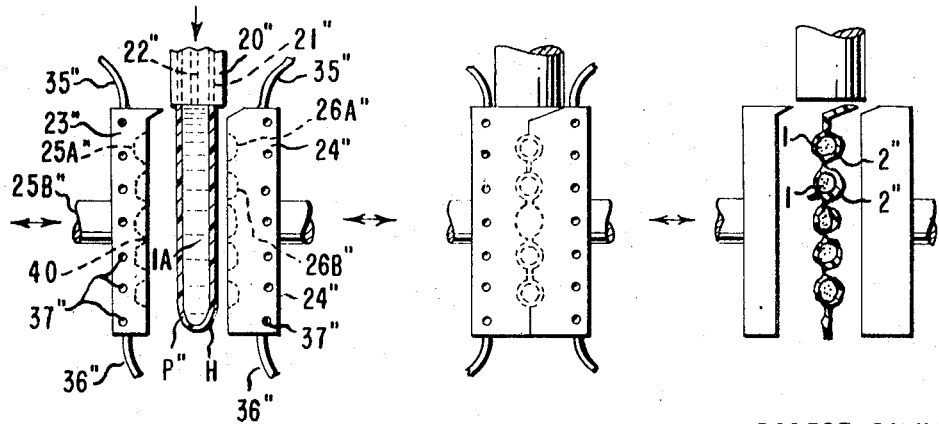
INVENTORS
ROBERT DILMAN SMITH
RONALD LEE HERRON

METHOD OF MAKING SEALING RING WITH RESILIENT CORE

CROSS REFERENCES TO RELATED APPLICATIONS AND PATENTS

U. S. Pat. No. 2,717,025
U. S. Pat. No. 2,859,061
U. S. Pat. No. 3,085,083
U. S. Pat. No. 2,991,508

FIELD OF THE INVENTION

This invention relates generally to the field of joint packing or fluid sealing members and more specifically to improved composite sealing ring members of the type having a continuous elastic or elastomeric inner core element which provides continuous direct support for a continuous thin outer layer of corrosion-resistant fluorinated plastic material the surface of which easily closely conforms to the sealing surfaces it engages. Also involved are manufacturing arrangements for such improved members.

It is an object of this invention to provide a novel improved sealing ring member of the type described above, which is simpler and more economical to manufacture and install yet rugged, effective, and reliable in use. It is a further object to provide effective arrangements for the manufacture of such improved members, other objects and advantages will appear hereinafter.

PRIOR ART BACKGROUND OF THE INVENTION

As indicated in U. S. Pats. No. 2,717,025 and No. 2,859,061 composite sealing ring members of specific types and constructions having elastomeric cores covered by a layer of solid tetrafluoroethylene are known in the art. There is also evidence that the manufacture of sealing ring members having a non-continuous elastomeric core element surrounded by a inner non-continuous polytetrafluoroethylene sleeve and an outer sleeve of a copolymer of hexafluoropropylene and tetrafluoroethylene has been tried.

Sealing rings having an outer layer of polytetrafluoroethylene have encountered serious problems in many applications not only because of the great difficulty in fabricating such rings without defects in the outer layer, but because of the very rigid unyielding non-resilient nature of this material which prevented the surface of such an outer layer from conforming to the engaged sealing surfaces in sufficiently tight sealing relationship when small imperfections and variations were present in such engaged sealing surfaces.

The more complex prior art seal ring arrangement mentioned above having a double layer surrounding the core is believed necessary due to the inability to satisfactorily join the butted ends of either the inner elastomeric core or the inner sleeve of polytetrafluoroethylene. In addition it is believed that the inner sleeve is required as a protective element to shield the core against the heat required to bind the outer sleeve ends together and to prevent kinking of the outer sleeve in forming small diameter sealing rings. In use, this type of ring is excessively hard, lacks resilience, and is subject to permanent deformation by relatively low forces. This is due to the fact that for given seal dimensions, there is less interior room or volume for the resilient core material when the additional inner sleeve is required. Furthermore, the sealing action is not reliable since tension on the ring structure tends to separate the abutted ends of the core element and of the inner sleeve (which removes the underlying support for the continuous outer sleeve) to permit leakage. Tension in the ring member also tends to weaken or destroy the bonded joint where the outer sleeve ends are joined, the inner members not being capable of internally resisting forces in tension since they are not continuous ring elements.

SUMMARY OF THE INVENTION

Generally stated, the requirements of improved seal efficiency for corrosive fluids operating over wide temperature ranges are satisfactorily met and the deficiencies of the prior art seal ring members are overcome in the sealing member construction of this invention and its manufacturing arrangement. The seal member construction, in its most preferred form, comprises an unbroken continuous resilient core element which provides continuous support for a coextensive unbroken continuous surrounding sleeve or layer formed of a corrosion resistant fluorinated plastic material and provided with a smooth continuous outer surface which is sufficiently resiliently yieldable to low pressure deformations to conform closely to minute imperfections and variations in an engaged surface to provide an effective fluid sealing relationship therewith. In other forms the sealing ring member construction involves the same unbroken one-piece inner core element and an outer layer, which although one-piece and continuous, possesses a minimum number of bonded or fused portions. The principle of the invention is believed broad enough to extend to inner cores which are gaseous.

DESCRIPTION OF THE DRAWINGS

FIG. 1 is a partial perspective view of a sealing ring member embodying principles of this invention with a portion of the outer corrosion resistant layer or sleeve shown broken away to expose the resilient core element.

FIG. 2 illustrates a general first step in one version of a process for producing the sealing ring members of this invention, which involves bending a tubular element of the corrosion-resistant material into a ring-like configuration with its open end portions generally in abutment.

FIGS. 3A, 3B, and 3C illustrate steps in bonding together the opposed ends of a tubular element as shown in FIG. 2. In FIG. 3A, a shortened auxiliary tubular sleeve element made of the same material as the tubular has been inserted in the open abutting ends of the main tubular element as shown, and the abutted end portions of the main tubular element are shown being heated by a hot air gun. FIG. 3B shows the structure of FIG. 3A in which the ends of the main tubular element and the auxiliary inner sleeve element have been fused together to form the main tubular element into a unitary continuous annular hollow ring structure. FIG. 3C shows the structure of FIG. 3B in which the outwardly extending fused portions have been removed to provide a hollow ring structure of uniform transverse exterior dimensions.

FIGS. 4A, 4B, and 4C illustrate somewhat different steps for bonding together the opposed ends of a tubular element as shown in FIG. 2. In FIG. 3A a shortened auxiliary tubular sleeve element made of an acid-dissolvable metallic composition has been inserted in the open abutting ends of the main tubular element as shown, and the and the abutting ends are shown being heated by a hot air gun. FIG. 4B shows the structure of FIG. 4A in which the heated ends of the main tubular element have been moved within a close-fitting surrounding frangible glass tube and allowed to fuse together while restrained by the glass tube and inner metal sleeve to maintain uniform exterior and interior dimensions. FIG. 4C shows the resulting fused bonded ends after the glass tube and metal sleeve have been removed as will be described hereinafter. FIG. 4D shows a general arrangement similar to that in FIGS. 4A, 4B, and 4C except that the heat for fusing the ends of the main tubular element is provided by positioning an electrical resistance heating element as shown around the outside of the glass tube instead of using the hot air gun before the glass tube is placed in its restraining position.

FIG. 5 is a general schematic cross sectional view illustrating the insertion of a solidifiable liquid elastomeric composition into the hollow interior of the annular ring structure and concurrent withdrawal of air from this hollow interior by means of hypodermic needle units.

FIG. 6 shows the use of a hot air gun to seal the openings through the filled annular ring structure and restore the ring structure to continuous unbroken uniform thickness configuration.

FIG. 7 illustrates an arrangement for forming annular ring structures of small radii of curvature without wrinkling or distortion of the curved material. The arrangement involves passing a heated fluid such as steam through the tubing for a sufficient period, wrapping the tubing around a forming mandrel while the tubing is still heated, allowing the tubing to cool in position on the mandrel and cutting to form the individual main tubular elements.

FIG. 8 is a partial perspective generalized view of one form of apparatus for manufacturing sealing ring members of this invention, showing one form of an extruded parison prior to being molded and expanded by an internal pressurized fluid to form a preferred hollow ring member without seams or bonded portions.

FIG. 9 is an enlarged cross-sectional view through a portion of the engaged opposed mold elements of FIG. 8 taken at line 9—9 of FIG. 8.

FIG. 10 is an end view of a mold element similar to those shown in FIGS. 8 and 9 except that provision is made for forming a plurality of ring members during each extrusion-molding cycle rather than only one.

FIGS. 11, 12, and 13 show a partial general side elevational view of another form of apparatus similar to that of FIG. 18 for manufacturing sealing ring members of the invention, showing another form of extruded parison filled with the solidifiable liquid elastomeric core material prior to being molded to form another form of preferred hollow ring member without seams or bonded portions. The apparatus is shown in its three major stages of operation in forming a plurality of filled core members during a single extrusion-molding cycle.

The most preferred embodiment of the composite sealing ring member of this invention is indicated generally in FIG. 1 and comprises an unbroken continuous solid inner core element 1 of constant cross-section and formed of a suitable elastomeric composition such as for example silicone rubber, preferably a composition which maintains its resilient properties over a wide range of temperature and has a suitable degree of tensile strength to accommodate a significant degree of stretching without failure. An outer sleeve or layer 2 of uniform thickness engages and surrounds the core element 1 and is also continuous, unbroken and without significant bonded or fused areas. Sleeve element or hollow ring 2 is formed of a suitable corrosion resistant flexible material which maintains its properties over a wide temperature range, and forms a smooth exterior surface which is sufficiently resiliently yieldable to low pressure deformations to conform closely to minute imperfections and variations in an engaged surface to form an effective fluid sealing engagement therewith. An example of a preferred material is a solid copolymer of hexafluoropropylene and tetrafluoroethylene. Such compositions are melt extrudable and their preparation is disclosed in above-mentioned U. S. Pat. No. 3,085,083.

The most preferred version of the composite sealing ring member of the invention as discussed above may be manufactured as shown in FIGS. 8–13. This manufacturing arrangement is based on the use of a somewhat modified version conventional extrusion blow molding apparatus.

In FIG. 8, a partly molten flattened tubular parison P with a hollow interior H and pinched-off end E is shown after being extruded from an annular extrusion orifice O in an extrusion head 20. The orifice O is supplied with molten material through an annular passageway 21. A passageway 22 in the extrusion head is arranged in the usual manner to supply a gas such as nitrogen under pressure to the interior of the parison at the desired time. When the partly molten parison is in the proper position opposed mold members 23 and 24, each having opposed ring-forming cavities 25 and 26 in the cooperating faces thereof, are brought together into operative molding engagement, by means such as reciprocating drive rods 27, to form the hollow outer ring element 2' as shown in FIG. 9. Air is supplied internally of the parison at the proper time to insure desired formation of ring element 2'. As shown in FIG. 9 the right-hand mold cavity 26 is formed with sharp edges which complete formation of the ring element and sever it from the remainder of the parison. Next, while the newly-formed ring element 2' is still in the closed mold members two slidable hollow needle elements 31 and 32 carried by a unit 28 on shaft 27 are moved into communication with the hollow interior of ring element 2'. As hollow needle element 32 moves into this position, a radial passageway therein moves into communication with a supply conduit 34 which supplies into the interior of ring element 2', under pressure, a solidifiable liquid elastomeric material. Simultaneously, through a similar arrangement, hollow needle element 31 moves, under action of suitable means (not shown), into communication with an exhaust or vacuum conduit 33 to remove the gas from the interior of hollow ring element 2' as the liquid elastomeric material is supplied thereto. When the ring element 2' is filled the needles are withdrawn and the ring element allowed to cool to its solid state sealing off the puncture openings made by the needles. The liquid elastomer is then allowed to solidify and cure and the completely formed deposit ring element is removed from the mold elements for further handling.

It is also possible as shown in FIG. 10 to use a concentric ring multi-cavity mold arrangement to produce a number of the composite ring members in one extrusion-blow-molding cycle.

Another version of this apparatus is shown in FIGS. 11 – 13 which is the same as that of FIG. 8 except that concentric multi-cavity mold elements are used and the hollow parison P'' is initially directly filled with a carefully controlled quantity of the solidifiable liquid elastomer and then engaged by the opposed mold members 23'' and 24'' to form the composite ring members directly as shown the excess material being forced by design of the mold into the interior recess 40 of the mold members. The elastomeric material is allowed to solidify and the outer layer to cool after which the composite ring members are removed from the apparatus as shown in FIG. 13.

Other simpler arrangements for manufacturing the improved composite sealing ring members of the invention without expensive molding arrangements are illustrated in FIGS. 2 – 7. In one such arrangement, desired lengths of already extruded tubing 2 to form the outer layer of the composite ring member are placed in a configuration with the open ends in opposed abutting relationship as shown in FIG. 2. Then as shown in FIGS. 3A, B, and C an inner sleeve 3 of the same material as the tube 2 is positioned as shown and the abutted ends heated by a conventional hot air gun AG to form the fused bonded joint 4 seen in FIG. 3B which after suitable finishing to reestablish a uniform outer cross sectional dimension, has the appearance shown in FIG. 3C. Another arrangement for joining the ends of the tubing 2 is shown in FIG. 4A, B, and C. In these figures a thin metallic sleeve 6 is positioned inside the ends as shown, the abutted ends are heated by hot air gun AG as shown and a glass sleeve 7 is positioned over the fused material as shown in FIG. 4B to control the bonded joint dimensions. After formation of the bonded joint the glass sleeve 7 is removed, by breaking, and the inner metal sleeve 6 is removed by dissolving in acid and removing before insertion of the core material as described hereinafter. Yet another arrangement for forming this bonded joint is shown in FIG. 4D. The same structural arrangement as shown in FIG. 4B is established before heating then electrical resistance heater coil elements 12 are positioned as shown around the glass sleeve and energized to heat the ends of tubing 2 and form the fused bonded joint 8. After joint formation the sleeves 6 and 7 can be removed as mentioned above.

The hollow ring element 2 formed by one of the methods discussed above are next filled by a method such as that illustrated in FIG. 5 in which a solidifiable liquid 1A elastomeric material is injected through a hypodermic needle like device 9 while air inside the ring element is being removed by a similar device 10. When the ring interior is filled, the punctured portions of the tube element are sealed by application of hot air gun AG as shown in FIG. 6. Upon solidifying and curing of the core material the formation of the composite ring member is complete.

FIG. 7 shows an arrangement used in forming small diameter hollow ring elements from tubing by passing a heated fluid through the tubing while it is being positioned around a forming mandrel M. This technique is used to avoid wrinkling or kinking the tubing when forming small diameter rings. The tubing is cut after cooling to form the ring elements shown in FIG. 2. It will be seen that this latter method produces a composite sealing ring member with a continuous inner core and a protective sleeve with minimum seams or bonded portions. It is important that the outer corrosion resistant layer 2 be of sufficient thickness to adequately protect the elastic core, yet it must be held to a minimum thickness to permit the presence of sufficient core material to provide the elastic support necessary to provide the desired sealing action at varying temperatures.

Outer layer thicknesses from about 10 to about 25 mils have been satisfactorily used in preparing hollow members of this invention and these thicknesses, when used in tubular members having diameters of about 250 mils, and silicone rubber core elements with an elasticity indicated to be in the range of between about 10 to about 75 durometer reading will produce a highly resilient effective sealing ring member.

It is believed that the core element volume should be above 35 percent of the volume of the composite ring member in order to achieve the desired degree of resilience.

It is believed that composite seal members of this invention in which the core element is a gas will provide an effective sealing action in many applications. The pressure of the gas and its characteristics such as molecular size to minimize its permeation through the outer layer, are carefully controlled for the expected operating conditions.

It is believed clear that a novel improved composite sealing ring member and its manufacture have been provided in accordance with the object of the invention.

Although certain preferred embodiments of the invention have been described in detail in accordance with the Patent Law, many variations and modifications within the spirit of the invention will be obvious to those skilled in the art and all such are considered to fall within the scope of the following claims.

What is claimed is:

1. A process for forming a composite endless sealing member, said process comprising the following steps in combination; forming a loop from an elongated substantially uniform flexible sleeve element formed of a solid high molecular weight copolymer of hexafluoropropylene and tetrafluoroethylene, said sleeve element being continuous and unbroken between said ends and having a smooth exterior surface; bringing together and butt-welding the opposed ends of said sleeve element to form a fluid filled hollow torus with smooth unbroken interior and exterior surfaces; providing at least one opening in said sleeve element; removing the fluid present inside said hollow torus and introducing in its place a solidifiable liquid silicone rubber composition through said small openings in said sleeve element until said hollow torus is filled with said liquid silicone rubber composition; sealing said small openings and while maintaining said sleeve element in an uncompressed state causing said liquid silicone rubber composition to solidify thereby forming a continuous unbroken resilient core inside of and coextensive with a smooth continuous sleeve element.

2. The process of claim 1 in which a heated fluid is passed through said sleeve element during loop formation, said fluid being maintained at a temperature below the melting point of the copolymer, high enough to allow plastic deformation of said sleeve element, thereby preventing the formation of irregularities in the surface of said sleeve element during loop formation.

3. The process of claim 1 further comprising the step of positioning a short auxiliary tubular sleeve element having an outer diameter substantially equal to the inner diameter of said sleeve element within said sleeve element in a manner such as to bridge the gap between the opposed ends of said sleeve element where the opposed ends of said sleeve element are brought together, and wherein the step of butt-welding the opposed ends of said sleeve element is accomplished by heating the abutting ends of said sleeve element and said auxiliary tubular sleeve member until the ends of said sleeve element are fused together to form a bonded joint including the material from said auxiliary tubular sleeve element.

4. The process of claim 3 further comprising the step of finishing the exterior of said hollow torus to reestablish a uniform outer cross-section dimension.

5. The process of claim 1 further comprising the steps of: positioning a first auxiliary element within said sleeve element and a second auxiliary element around the exterior of said sleeve element in a manner such that both of said auxiliary elements bridge the gap between the opposed ends of said sleeve element and define an annular region having cross-sectional dimensions substantially the same as the cross-sectional dimensions of said sleeve element when the opposed ends of said sleeve element are brought together, and thereafter removing said auxiliary elements from said torus.

6. The process of claim 5 wherein said first and second auxiliary elements are tubular elements.

7. The process of claim 5 wherein said first auxiliary element is made from a dissolvable substance and said second auxiliary element is made from a frangible substance, and wherein the process further comprises the steps of breaking said second auxiliary element and dissolving said first auxiliary element by introducing a solvent for the material from which said first auxiliary element is made into said hollow torus.

8. The process of claim 7 wherein said first auxiliary element is a thin metallic tube and said solvent comprises an acid which will dissolve the metal from which said metallic tube is made, and wherein said second auxiliary element is a glass tube.

* * * * *